US009740563B2

(12) United States Patent
Jandir et al.

(10) Patent No.: US 9,740,563 B2
(45) Date of Patent: Aug. 22, 2017

(54) CONTROLLING SOFTWARE PROCESSES THAT ARE SUBJECT TO COMMUNICATIONS RESTRICTIONS BY FREEZING AND THAWING A COMPUTATIONAL PROCESS IN A VIRTUAL MACHINE FROM WRITING DATA

(71) Applicant: International Business Machines Corporation, Armonk, NY (US)

(72) Inventors: Mandeep Kaur Jandir, San Jose, CA (US); Limor Provizor, Haifa (IL); Mark L. Yakushev, San Jose, CA (US); Asaf Yeger, Kiryat-Tivon (IL)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 13/902,738

(22) Filed: May 24, 2013

(65) Prior Publication Data

US 2014/0351822 A1 Nov. 27, 2014

(51) Int. Cl.
G06F 9/445 (2006.01)
G06F 11/14 (2006.01)
G06F 9/52 (2006.01)

(52) U.S. Cl.
CPC .......... *G06F 11/1438* (2013.01); *G06F 9/526* (2013.01); *G06F 11/1446* (2013.01); *G06F 2209/522* (2013.01)

(58) Field of Classification Search
None
See application file for complete search history.

(56) References Cited

U.S. PATENT DOCUMENTS 5,377,352 A  12/1994 Tanaka et al.
5,790,851 A   8/1998 Frank et al.
(Continued)

FOREIGN PATENT DOCUMENTS

JP  2012-133768 A  7/2012

OTHER PUBLICATIONS

VMware Environments, "Veeam Backup & Replication", Version 6.0, User Guide, VMware Environments, Jan. 2012.
(Continued)

*Primary Examiner* — Wissam Rashid
*Assistant Examiner* — Michael Ayers
(74) *Attorney, Agent, or Firm* — David W. Victor; Konrad, Raynes, Davda and Victor LLP

(57) ABSTRACT

Controlling a software process by causing the execution of a first software process on a computer, where the first software process is configured to exclusively access a resource on the computer, causing the execution of a second software process on the computer when the first software process has exclusive access to the resource, where the second software process is configured to perform a first predefined action that is independent of the second software process accessing the resource, attempt to access the resource, and perform a second predefined action that is dependent on the second software process accessing resource, and causing the first software process to terminate its exclusive access to the resource, thereby causing the second software process to access the resource and perform the second predefined action.

24 Claims, 9 Drawing Sheets

(56) References Cited

U.S. PATENT DOCUMENTS

| | | | |
|---|---|---|---|
| 7,603,502 B2* | 10/2009 | Richter et al. | 710/200 |
| 7,831,977 B2* | 11/2010 | Shultz et al. | 718/104 |
| 8,150,936 B2 | 4/2012 | Liu et al. | |
| 8,166,265 B1 | 4/2012 | Feathergill | |
| 8,209,298 B1 | 6/2012 | Anglin et al. | |
| 8,516,210 B2* | 8/2013 | Buragohain et al. | 711/162 |
| 2002/0004810 A1* | 1/2002 | Reneris | G06F 9/526 718/104 |
| 2002/0133530 A1* | 9/2002 | Koning | G06F 9/52 718/102 |
| 2006/0123210 A1 | 6/2006 | Pritchett et al. | |
| 2010/0049929 A1 | 2/2010 | Nagarkar et al. | |
| 2012/0158666 A1 | 6/2012 | Anglin et al. | |
| 2014/0195759 A1 | 7/2014 | Gantman et al. | |
| 2014/0351822 A1 | 11/2014 | Jandir et al. | |
| 2015/0046402 A1 | 2/2015 | Peretz et al. | |
| 2015/0052320 A1 | 2/2015 | Peretz et al. | |

OTHER PUBLICATIONS

CA, "Agent for Virtual Machines Guide", CA ARCserve Backup for Windows, r12.5, 2009.
CA, "Microsoft Volume Shadow Copy Service", CA ARCserve Backup for Windows, r16, 2011.
U.S. Appl. No. 13/735,151.
English Abstract for JP2012133768, published Jul. 12, 2012, Total 26 pages.

* cited by examiner

CONTROLLING SOFTWARE PROCESSES THAT ARE SUBJECT TO COMMUNICATIONS RESTRICTIONS BY FREEZING AND THAWING A COMPUTATIONAL PROCESS IN A VIRTUAL MACHINE FROM WRITING DATA

FIELD OF THE INVENTION

The invention relates to controlling computer software processes in general.

BACKGROUND OF THE INVENTION

Conventional data backup techniques as applied to computing resources typically involve taking a periodic "snapshot" to preserve the state and data of computers and virtual machines that are hosted by computers. When taking a snapshot, it is typically necessary to first perform application quiescing to ensure data consistency. For example, in the case of a virtual machine running the Microsoft Windows™ operating system, application quiescing may be performed using the "Freeze" event handler of the Volume Shadow Copy Service (VSS). After the snapshot is taken, VSS may again be used to terminate the quiescence period using the "Thaw" VSS event handler. Likewise, the "Complete" VSS event handler may be used to cause data to be purged where such data are not required for future data backup operations, thereby freeing up system resources. In some virtual machine environments a software process on a virtual machine may receive instructions from outside of the virtual machine to initiate application quiescing, whereas once quiescence has been achieved instructions may no longer be received from outside of the virtual machine, such as to terminate the quiescence period or perform other postsnapshot operations. Such communications restrictions present a challenge to backup systems that operate separately from their data backup targets.

SUMMARY OF THE INVENTION

In one aspect of the invention a method is provided for controlling a software process, the method including causing the execution of a first software process on a computer, wherein the first software process is configured to exclusively access a resource on the computer, causing the execution of a second software process on the computer when the first software process has exclusive access to the resource, wherein the second software process is configured to perform a first predefined action that is independent of the second software process accessing the resource, attempt to access the resource, and perform a second predefined action that is dependent on the second software process accessing resource, and causing the first software process to terminate its exclusive access to the resource, thereby causing the second software process to access the resource and perform the second predefined action.

Systems and computer program products embodying the invention are also provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
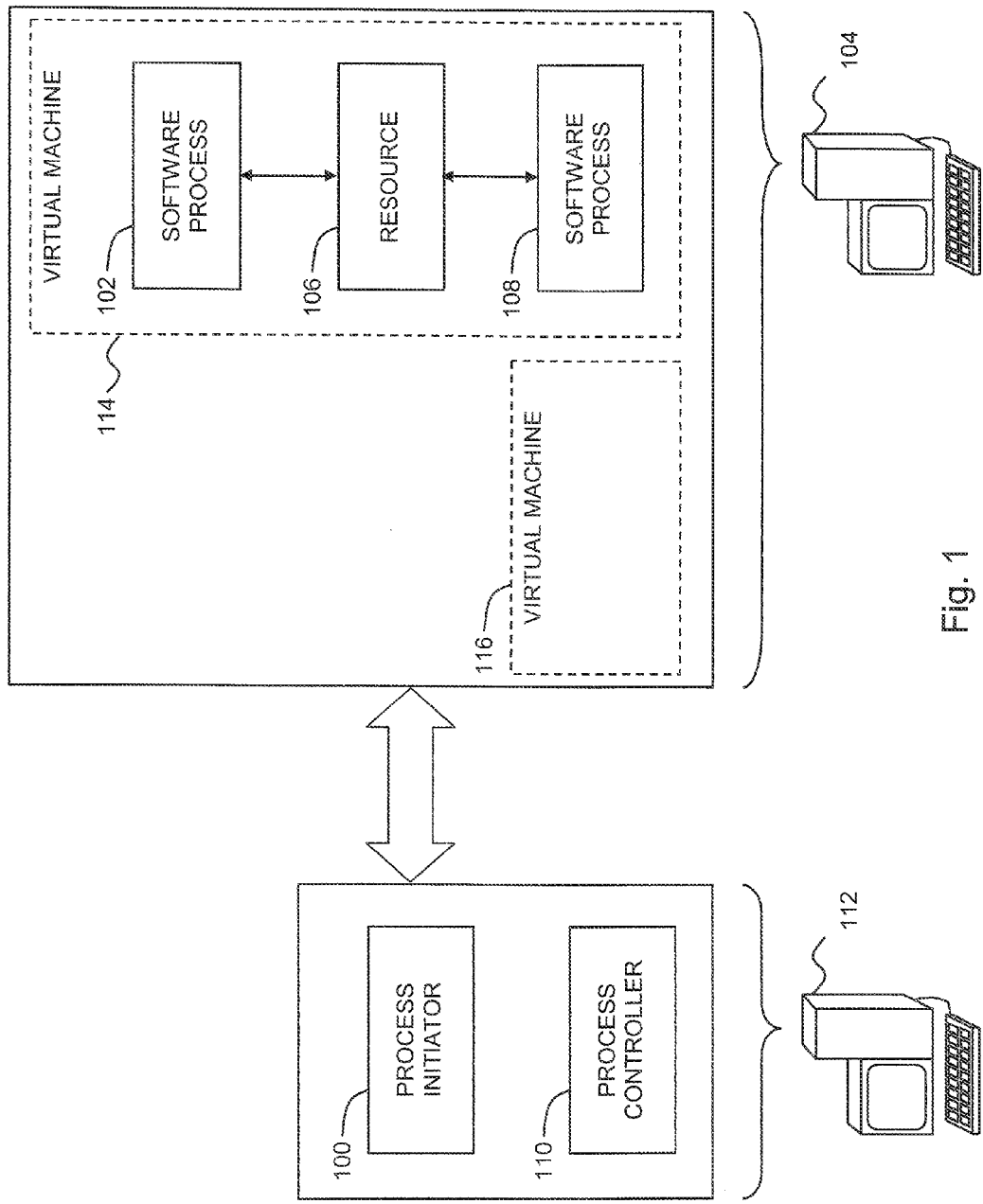
FIG. 1 is a simplified conceptual illustration of a system for controlling a software process, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for controlling a software process, constructed and operative in accordance with an embodiment of the invention. In the system of FIG. 1 a process initiator 100 is configured to cause the execution of a first software process 102 on a computer 104, where first software process 102 is configured to exclusively access a resource 106 on computer 104. The term "software process" as used herein may be understood to refer to computer software that may be executed by computer 104, as well as such computer software during its execution by computer 104. Process initiator 100 is also configured to cause the execution of a second software process 108 on computer 104 when first software process 102 has exclusive access to resource 106. Second software process 108 is preferably configured to perform a first predefined action that is independent of the ability of second software process 108 to access resource 106, which ability is dependent on first software process 102 terminating its exclusive access to resource 106, and perform a second predefined action that is dependent on the ability of second software process 108 to access resource 106 when first software process 102 terminates its exclusive access to resource 106, such as when first software process 102 is itself terminated.

The system of FIG. 1 also preferably includes a process controller 110 configured to cause first software process 102 to terminate its exclusive access to resource 106, such as by causing the execution of first software process 102 to be terminated, and thereby cause second software process 108 to perform the second predefined action.

Process initiator 100 and process controller 110 may be hosted by a computer 112 that is separate from computer 104, while software processes 102 and 108 may be hosted by computer 104, or by a virtual machine 114 that is itself hosted by computer 104. In this configuration process initiator 100 and process controller 110 affect software processes 102 and 108 as described above by transmitting instructions to computer 104 and/or virtual machine 114 from a point of origin that is external to computer 104 and/or virtual machine 114. In an alternative configuration, process initiator 100 and process controller 110 may be hosted by a virtual machine 116 that is itself hosted by computer 104, while software processes 102 and 108 may be hosted by virtual machine 114. In this configuration process initiator 100 and process controller 110 affect software processes 102 and 108 as described above by transmitting instructions to virtual machine 114 from a point of origin that is external to virtual machine 114.

Any of the elements shown in FIG. 1 that are implemented by computers 104 and 112 are preferably implemented in computer hardware and/or in computer software embodied in a non-transitory, computer-readable medium in accordance with conventional techniques.

Figure 2:
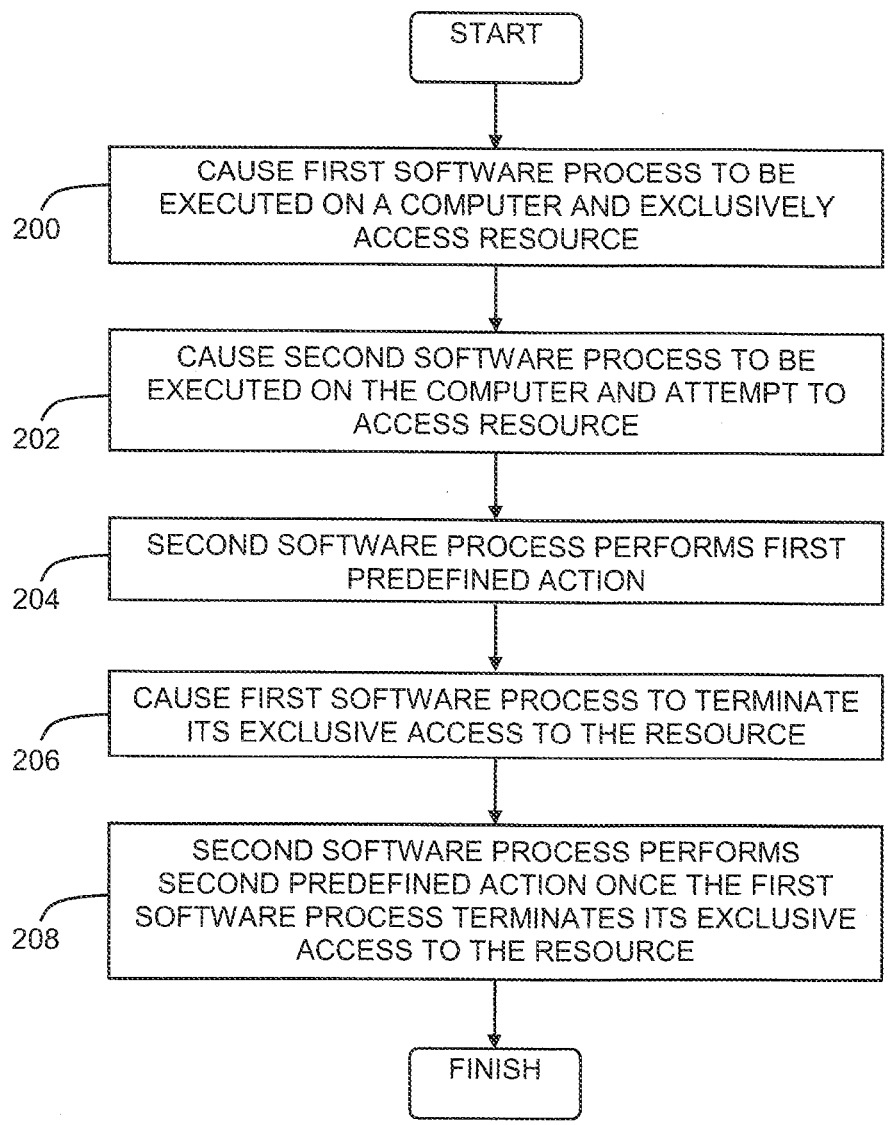
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2 a first software process is caused to be executed on a computer, where the first software process is configured to exclusively access a resource on the computer (step 200). A second software process is caused to be executed, on the computer in the same execution environment as the first software process, when the first software process has exclusive access to the resource (step 202). The second software process performs a first predefined action that is independent of the ability of the second software process to access the resource (step 204). The first software process is caused to terminate its exclusive access to the resource, such as where the execution of the first software process is caused to be terminated (step 206). The second software process accesses the resource and performs a second predefined action that is dependent on the ability of the second software process to access the resource (step 208).

Figure 3A:
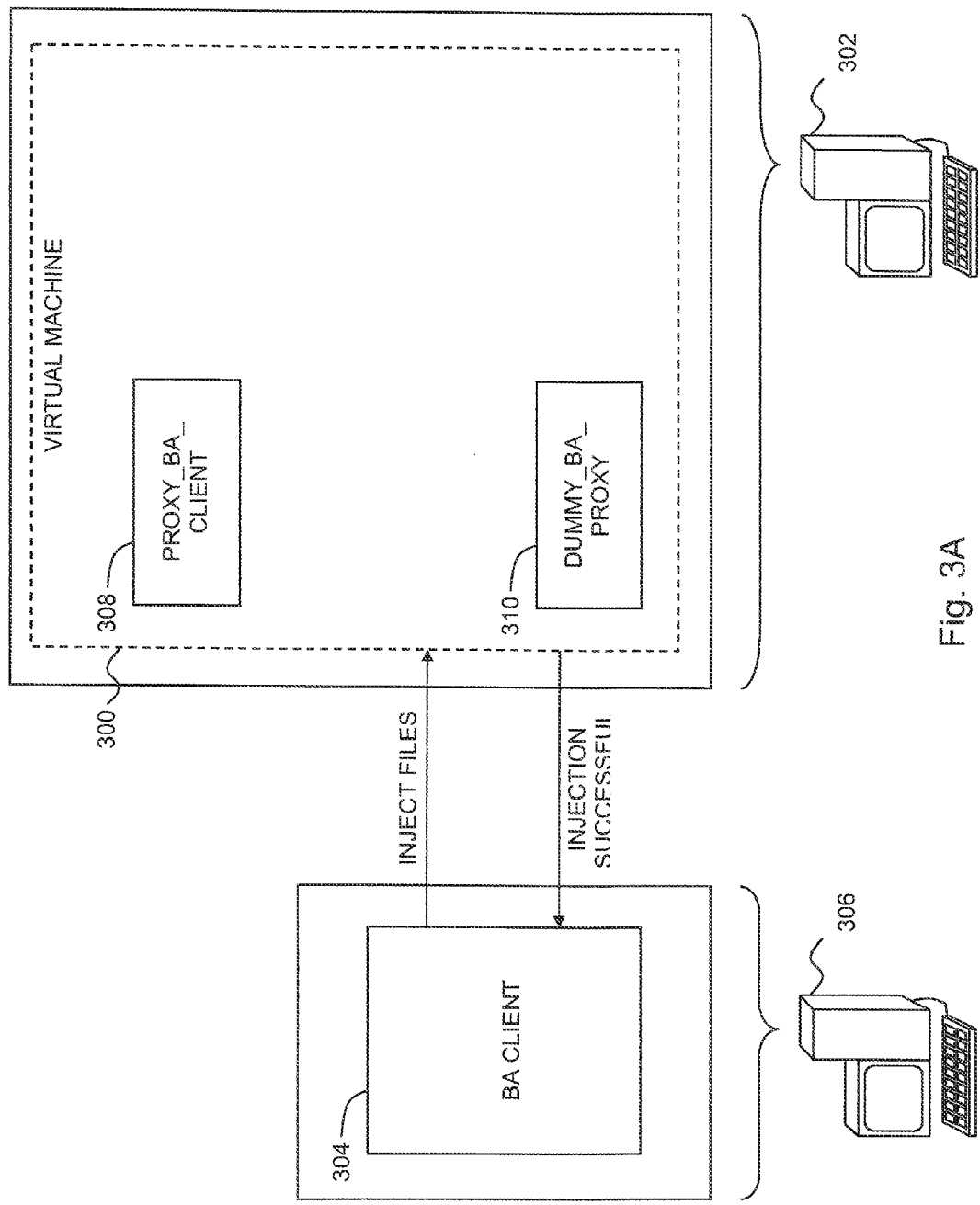
FIGS. 3A-3F are simplified conceptual illustrations of an exemplary method of operation of the system of FIG. 1, operative in accordance with an embodiment of the invention.

The system of FIG. 1 and method of FIG. 2 may be illustrated in the context of an exemplary operational scenario as shown in FIGS. 3A-3F. In FIG. 3A, a virtual machine (VM) 300 is shown being hosted by a computer 302. VM 300 may, for example, be a virtual machine running Microsoft Windows™ 7, commercially-available from Microsoft Corporation, Redmond, Wash., under virtualization software, such as ESX™ v5.0, is commercially-available from VMware, Inc., Palo Alto, Calif. A backup archive (BA) client 304, such as TSM for Virtual Environments™ that is commercially-available from IBM Corporation, Armonk, N.Y., is shown being hosted by a computer 306, where BA client 304 preferably includes the functionality of process initiator 100 and process controller 110 as described above with reference to FIGS. 1 and 2. BA client 304 injects a first software process, Proxy_BA_Client 308, and a second software process, Dummy_BA_Proxy 310, into VM 300, and the success of the injection is reported to BA client 304.

Figure 3B:
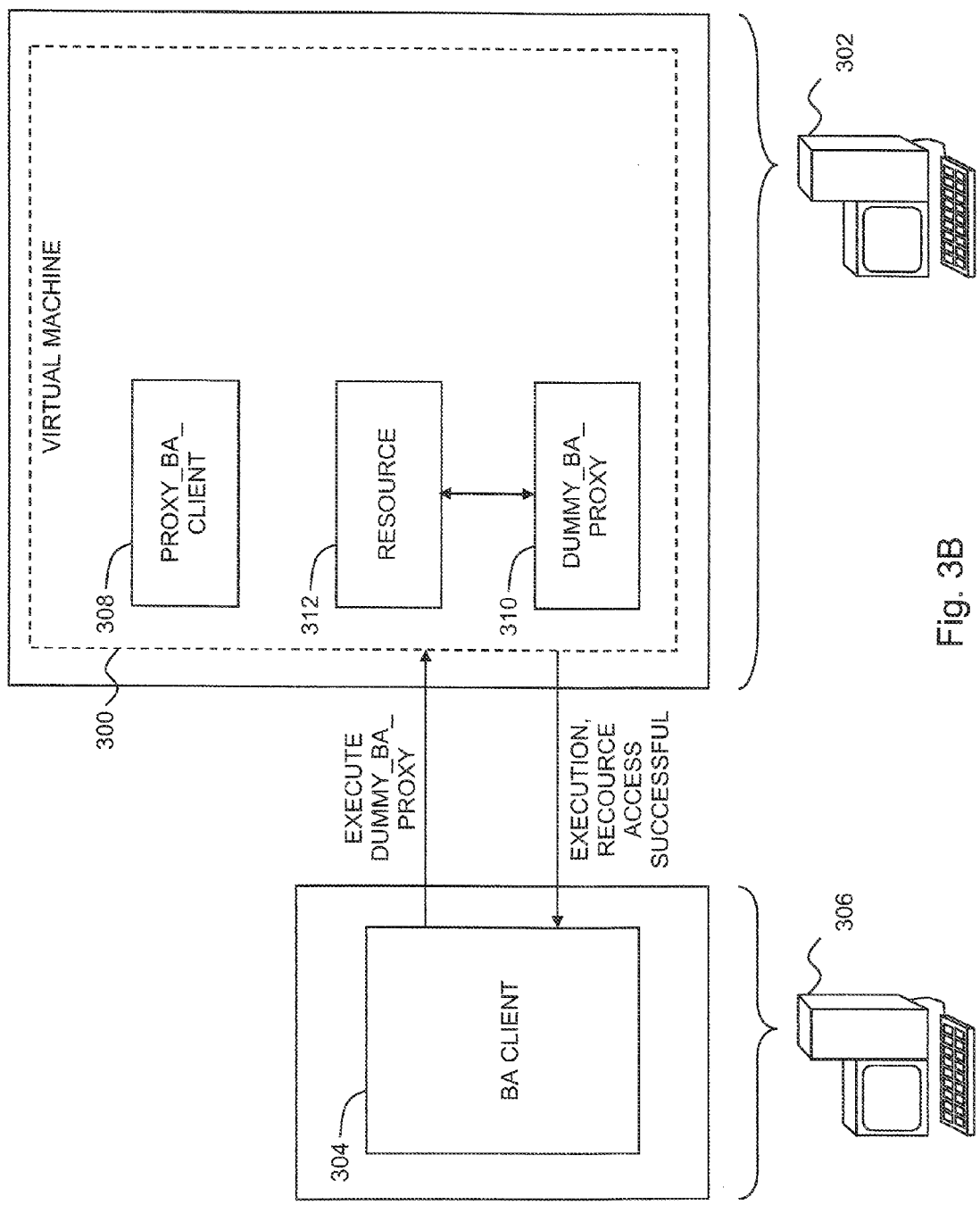

In FIG. 3B, BA client 304 causes Dummy_BA_Proxy 310 to be executed, whereupon Dummy_BA_Proxy 310 creates a resource 312, such as Global\\TsmVwareDpVSS_ThawEx, exclusively accesses resource 312, and enters an indefinite wait state. Success of the execution of Dummy_BA_Proxy 310 and its exclusive access to resource 312 is reported to BA client 304.

Figure 3C:
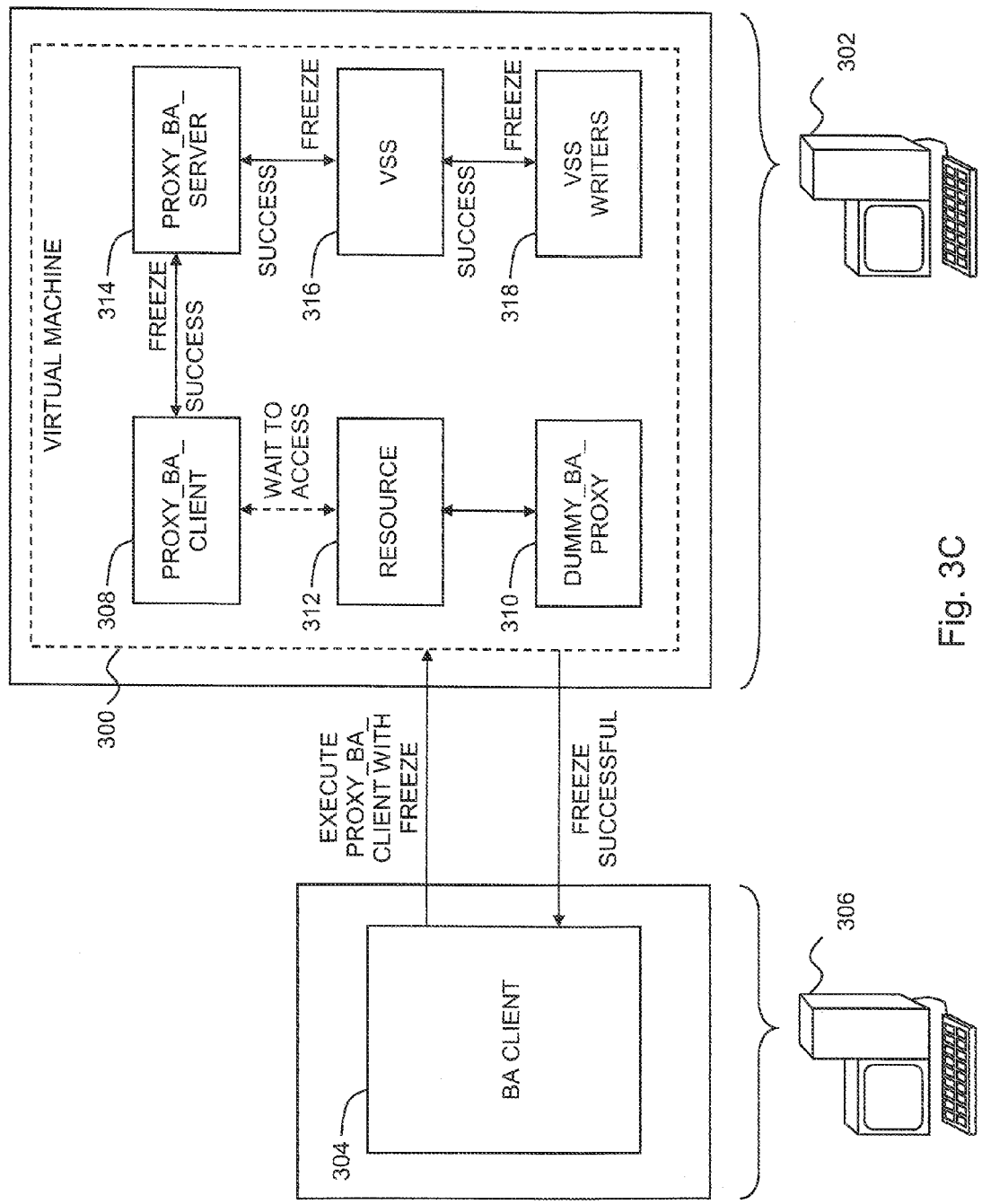

In FIG. 3C, BA client 304 causes Proxy_BA_Client 308 to be executed. Proxy_BA_Client 308 is configured to perform a first predefined action of "freezing" VM 300 in preparation for performing a data backup operation. Alternatively, BA client 304 causes Proxy_BA_Client 308 to be executed by sending a command to VM 300 that includes a command to Proxy_BA_Client 308 to freeze VM 300. To accomplish this Proxy_BA_Client 308 sends a "freeze" request to a Proxy_BA_Server 314 causing Proxy_BA_Server 314 to be executed, where Proxy_BA_Server 314 may be preconfigured with VM 300 or which may also have been injected into VM 300 by BA Client 304. Proxy_BA_Server 314 relays the "freeze" request to a Microsoft Windows™ component, Volume Shadow Copy Service (VSS) 316, which freezes VM 300 by preventing data from being written to data storage device locations. If VSS 316 succeeds in freezing VM 300, such as by causing VSS writers 318 to suspend writing to data storage, VSS 316 reports the success to Proxy_BA_Server 314, which relays the report of the success to Proxy_BA_Client 308 which in turn relays the report of the success to BA Client 304.

Proxy_BA_Client 308 attempts to access resource 312, but is prevented from accessing resource 312 due to Dummy_BA_Proxy 310 still maintaining its exclusive access to resource 312. Proxy_BA_Client 308 enters an indefinite wait state until it successfully accesses resource 312.

Figure 3D:
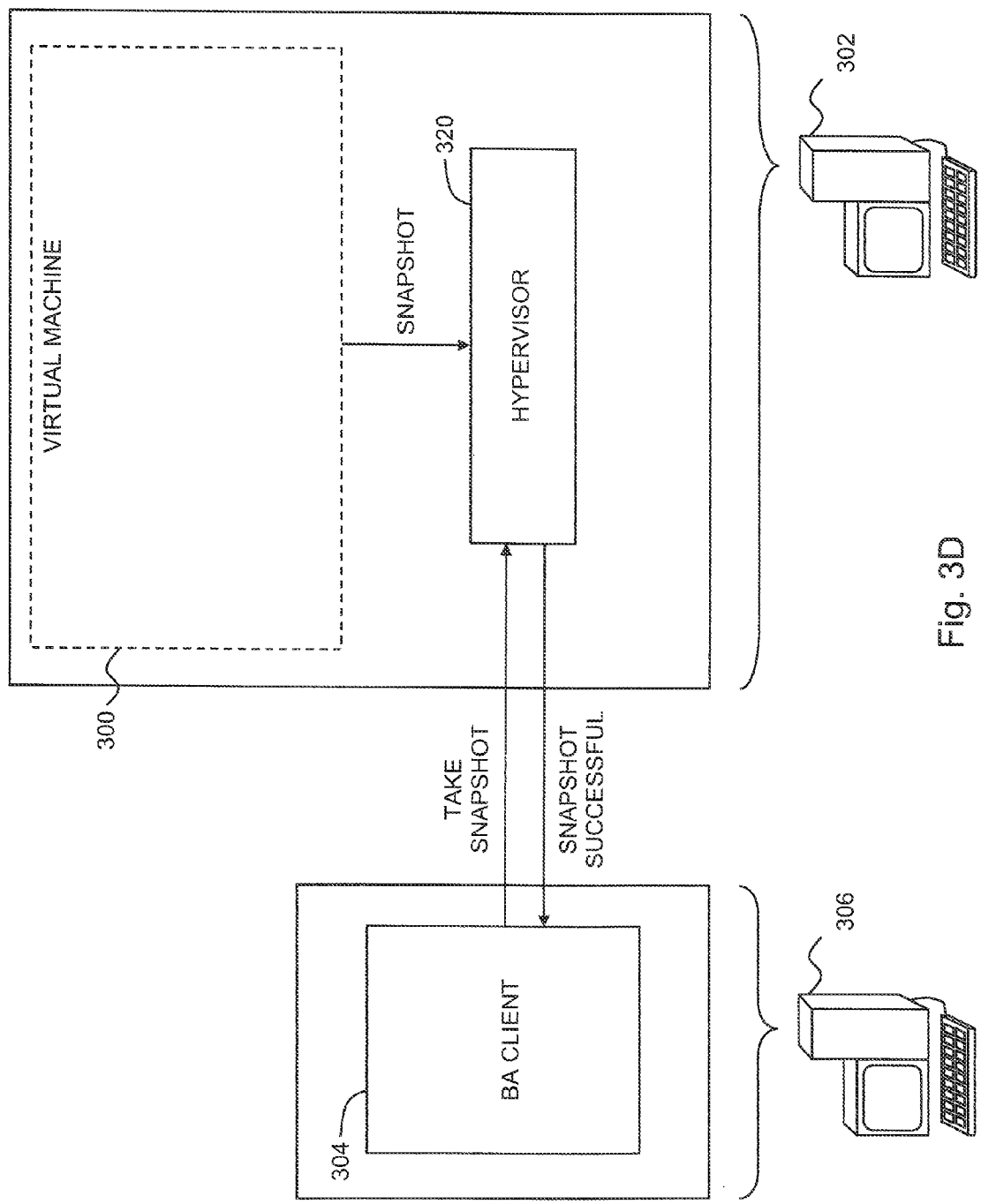
Figure 3E:
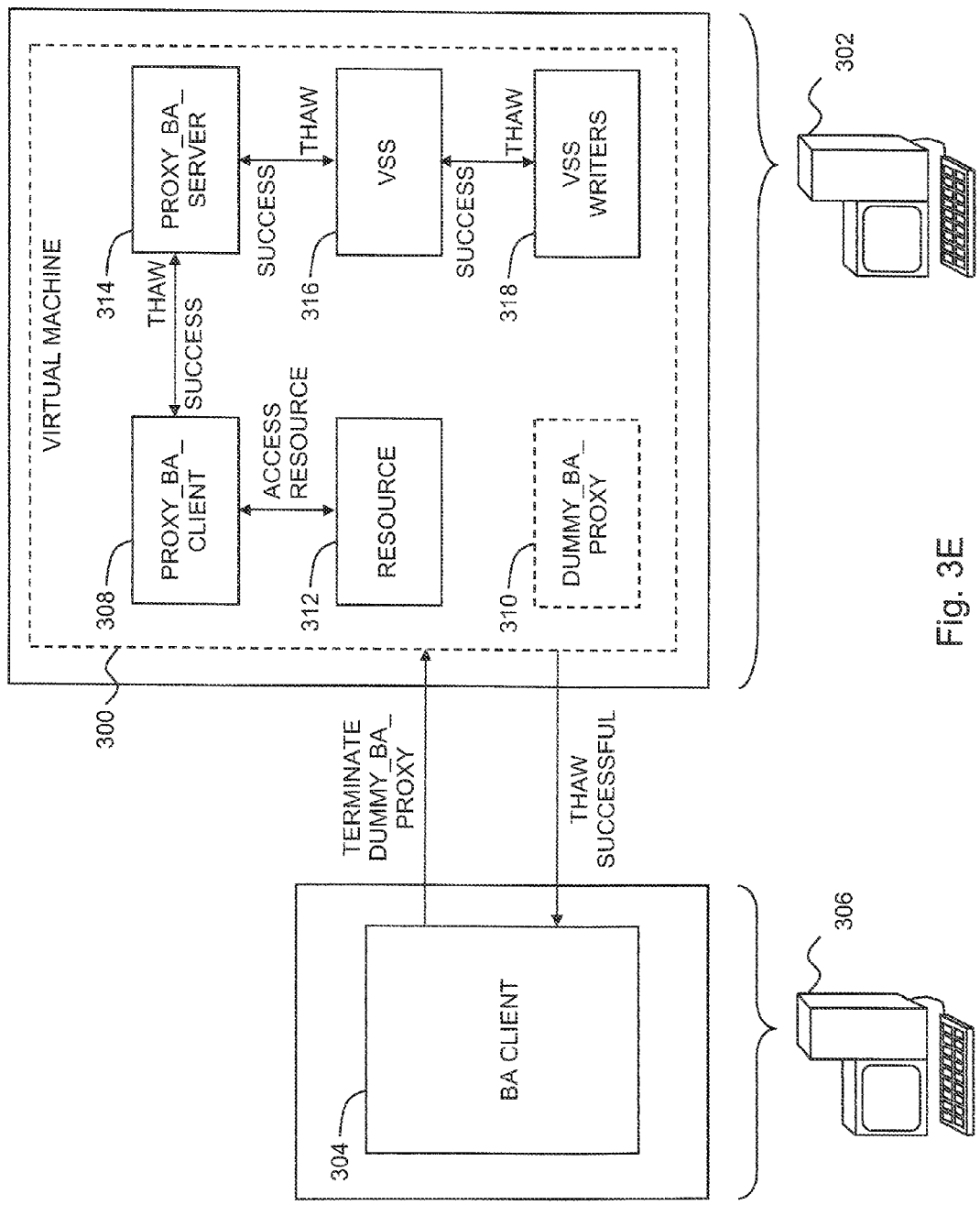

In FIG. 3D, BA client 304, having been notified of the successful freeze, requests from a hypervisor 320 of VM 300 that a "snapshot" of VM 300 be taken to preserve the state and data of VM 300 in preparation for performing the data backup operation. The snapshot may, for example, be performed without the assistance of VSS 316 by using the VMware™ vStorage™ API. If the snapshot is successful, hypervisor 320 reports the success to BA Client 304.

Where BA client 304 is unable to communicate with Proxy_BA_Client 308, such as where VMware™ restricts communications with Proxy_BA_Client 308 while Proxy_BA_Client 308 is being executed where such communications originate outside of VM 300, BA client 304 cannot directly instruct Proxy_BA_Client 308 to "thaw" VM 300. Thus, in FIG. 3E, BA client 304, having been notified of the successful snapshot, causes Dummy_BA_Proxy 310 to be terminated, which in turn causes the termination of the exclusive access of Dummy_BA_Proxy 310 to resource 312, enabling Proxy_BA_Client 308 to access resource 312. Proxy_BA_Client 308 is configured to perform a second predefined action of "thawing" VM 300 that is dependent on Dummy_BA_Proxy 310 terminating its exclusive access to resource 312. To accomplish this Proxy_BA_Client 308 sends a "thaw" request to Proxy_BA_Server 314, which relays the "thaw" request to VSS 316. VSS 316 thaws VM 300, such as by permitting VSS writers 318 to resume writing data to data storage device locations that are not involved in the current data backup operation. If VSS 316 succeeds in thawing VM 300, such as permitting VSS 316 reports the success to Proxy_BA_Server 314, which relays the report of the success to Proxy_BA_Client 308 which in turn relays the report of the success to BA Client 304.

Figure 3F:
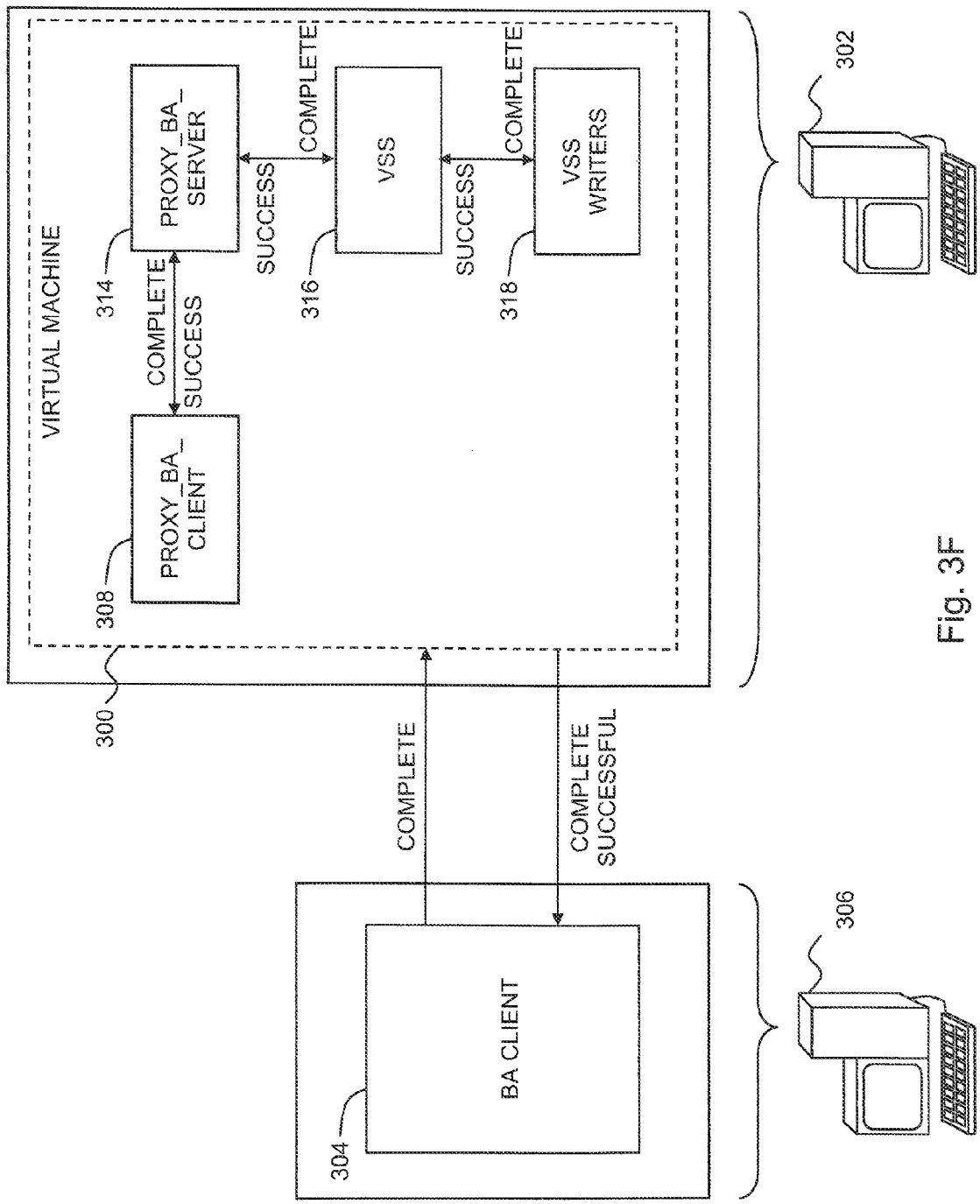

In FIG. 3F, BA client 304, having been notified of the successful thaw, performs the data backup operation of VM 300 in accordance with conventional techniques. After BA client 304 successfully finishes copying the snapshot data to backup data storage, BA client 304 sends a command to VM 300 that includes a command to Proxy_BA_Client 308 to perform a "Complete" operation in which data that have been backed up and therefore are not required for future backup operations may be purged to free up system resources. Proxy_BA_Client 308 preferably relays the "Complete" command to VSS 316 via Proxy_BA_Server 314 as described hereinabove.

Figure 4:
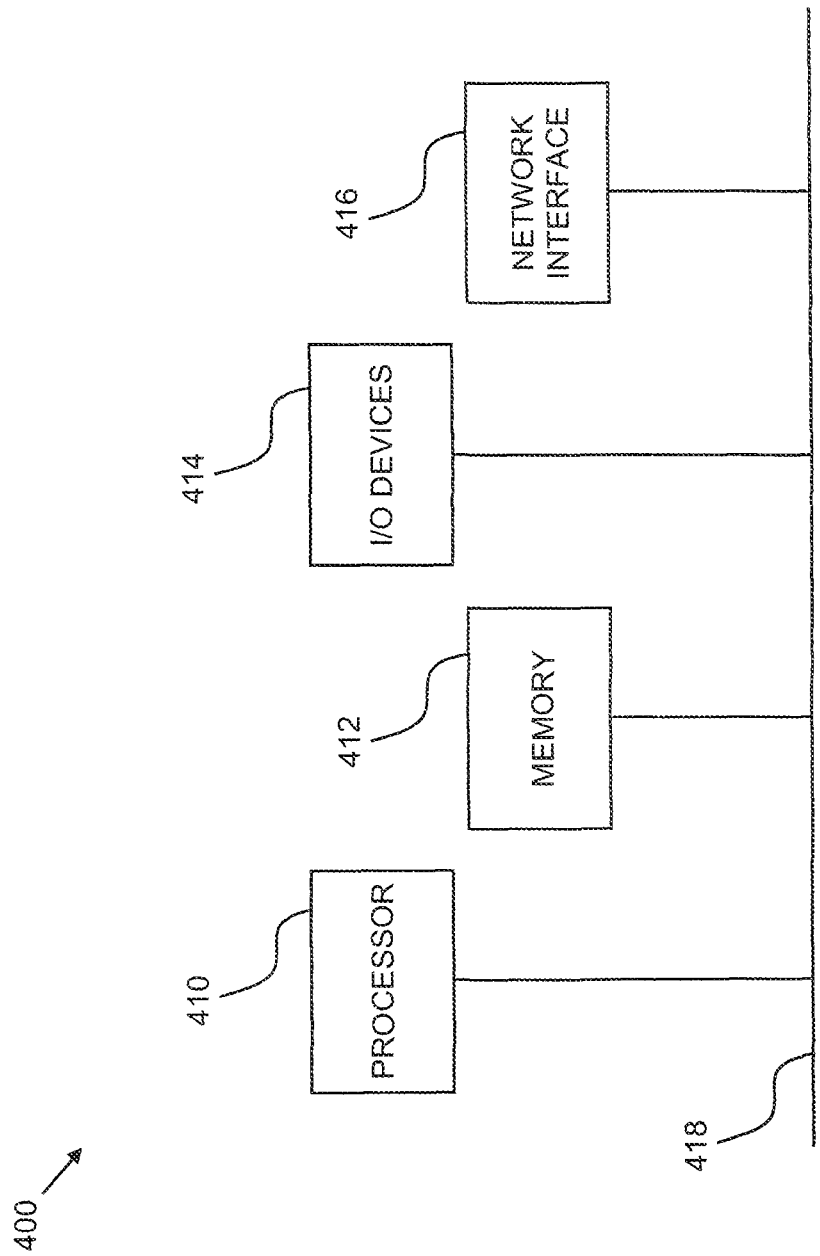
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for controlling execution a software process on a virtual machine hosted by a computer, the method comprising:
   initiating, by the computer, execution of a first software process on the virtual machine to exclusively access a resource on the computer;
   initiating, by the computer, execution of a second software process on the virtual machine during a time when the first software process has exclusive access to the resource,
   in response to initiating execution of the second software process, the second software process is configured to:
      initiate a freeze of a computational process in the virtual machine that is independent of the second software process accessing the resource, wherein the freeze prevents the computational process from writing data to at least one data storage device location, and
      request to access the resource, wherein the second software process cannot access the resource while the first software process exclusively accesses the resource,
   terminating the first software process exclusive access to the resource in response to the freezing of the computational process initiated by the second software process, and
   in response to the first software process terminating exclusive access to the resource,
      accessing the resource, by the second software process, and
      initiating thawing of the computational process, wherein the thawing of the computational process causes the computational process to continue writing data to the at least one data storage device location.

2. The method according to claim 1, wherein the first software process is configured to maintain its exclusive access to the resource until the first software process is terminated.

3. The method according to claim 2 and further comprising causing execution of the first software process to be terminated, thereby causing the first software process to terminate its exclusive access to the resource.

4. The method according to claim 1, wherein the initiating the execution of the first software process and the initiating the execution of the second software process are performed by transmitting instructions to the virtual machine from a point of origin that is external to the virtual machine.

5. The method according to claim 1, wherein the freeze prevents the computational process in the virtual machine from writing to a first data storage device location, and wherein the thawing permits the computational process in the virtual machine to write to a second data storage device location.

6. The method according to claim 1 and further comprising configuring any of
   a) computer hardware and
   b) computer software embodied in a non-transitory, computer-readable medium,
   to perform the initiating and terminating operations.

7. The system of claim 1, wherein the first software process comprises a dummy backup archive proxy and wherein the second software process comprises a proxy backup archive client, wherein a backup archive client performs the initiating execution to initiate execution of the dummy backup archive proxy and the proxy backup archive client, and wherein the dummy backup archive proxy creates the resource.

8. The method of claim 7, wherein the computational process comprises a volume shadow copy service, wherein the volume shadow copy service freezes the virtual machine by causing virtual shadow copy service writers to suspend writing data, further comprising:
   requesting, by the backup archive client, a snapshot of the virtual machine in response to the freeze of the virtual machine being successful; and
   terminating, by the backup archive client, the dummy backup archive proxy access to the resource.

9. A system for controlling execution of a software process on a virtual machine hosted by a computer, the system comprising:
   a processor;
   a memory device including:
      a process initiator executed by the processor to
         initiate, by the computer, execution of a first software process on the virtual machine to exclusively access a resource on the computer, and
         initiate, by the computer, execution of a second software process on the virtual machine when the first software process has exclusive access to the resource,
      in response to initiating execution of the second software process, the second software process is configured to:
         initiate a freeze of a computational process in the virtual machine that is independent of the second software process accessing the resource wherein the freeze prevents the computational process from writing data to at least one data storage device location, request to access the resource, wherein the second software process cannot access the resource while the first software process exclusively accesses the resource, a process controller executed by the processor to terminate the first software process exclusive access to the resource in response to the freezing of the computation process initiated by the second software process, wherein the second software process, in response to the first software process terminating exclusive access to the resource, accesses the resource and initiates thawing of the computational process, wherein the thawing of the computational process causes the computational process to continue writing data to the at least one data storage device location.

10. The system according to claim 9 wherein the first software process is configured to maintain its exclusive access to the resource until the first software process is terminated.

11. The system according to claim 10 wherein the process controller is configured to cause the execution of the first software process to be terminated, and thereby cause the first software process to terminate its exclusive access to the resource.

12. The system according to claim 9 wherein the process initiator is configured to cause the execution of the first and the second software processes on the virtual machine that is hosted by the computer.

13. The system according to claim 12 wherein the process initiator is configured to cause the execution of the first and the second software processes by transmitting instructions to the virtual machine from a point of origin that is external to the virtual machine.

14. The system according to claim 12 wherein the freeze prevents the computational process in the virtual machine from writing to a first data storage device location, and wherein the thawing permits the virtual machine to write to a second data storage device location.

15. The system according to claim 9 wherein the process initiator and process controller are implemented in any of
   a) computer hardware, and
   b) computer software embodied in a non-transitory, computer-readable medium.

16. The computer program product of claim 9, wherein the first software process comprises a dummy backup archive proxy and wherein the second software process comprises a proxy backup archive client, wherein a backup archive client performs the initiating execution to initiate execution of the dummy backup archive proxy and the proxy backup archive client, and wherein the dummy backup archive proxy creates the resource.

17. The computer program product of claim 16, wherein the computational process comprises a volume shadow copy service, wherein the volume shadow copy service freezes the virtual machine by causing virtual shadow copy service writers to suspend writing data, further comprising:
   requesting, by the backup archive client, a snapshot of the virtual machine in response to the freeze of the virtual machine being successful; and
   terminating, by the backup archive client, the dummy backup archive proxy access to the resource.

18. A computer program product for controlling execution of a software process on a virtual machine hosted by a computer, the computer program product comprising:
   a non-transitory computer-readable storage medium; and
   computer-readable program code embodied in the non-transitory computer-readable storage medium, wherein the computer-readable program code is configured to:
      initiate, by the computer, execution of a first software process on the virtual machine to exclusively access a resource on the computer, and
      initiate execution of a second software process on the virtual machine when the first software process has exclusive access to the resource,
      in response to initiating execution of the second software process, the second software process is configured to:
         initiate a freeze of a computational process in the virtual machine that is independent of the second software process accessing the resource, wherein the freeze prevents the computational process from writing data to at least one data storage device location,
         request to access the resource, wherein the second software process cannot access the resource while the first software process exclusively accesses the resource, and
      terminating the first software process exclusive access to the resource in response to the freezing of the computational process initiated by the second software process, and
      in response to the first software process terminating exclusive access to the resource, access, by the second software process, the resource and initiate thawing of the computational process, wherein the thawing of the computational process causes the computational process to continue writing data to the at least one data storage device location.

19. The computer program product according to claim 18 wherein the first software process is configured to maintain its exclusive access to the resource until the first software process is terminated.

20. The computer program product according to claim 19 wherein the computer-readable program code is configured to cause execution of the first software process to be terminated, and thereby cause the first software process to terminate its exclusive access to the resource.

21. The computer program product according to claim 18, wherein the computer-readable program code is configured to cause the execution of the first and the second software processes by transmitting instructions to the virtual machine from a point of origin that is external to the virtual machine.

22. The method of claim 18, wherein the computational process comprises a volume shadow copy service, wherein the volume shadow copy service freezes the virtual machine by causing virtual shadow copy service writers to suspend writing data, further comprising:
   requesting, by the backup archive client, a snapshot of the virtual machine in response to the freeze of the virtual machine being successful; and
   terminating, by the backup archive client, the dummy backup archive proxy access to the resource.

23. The computer program product of claim 18, wherein the first software process comprises a dummy backup archive proxy and wherein the second software process comprises a proxy backup archive client, wherein a backup archive client performs the initiating execution to initiate execution of the dummy backup archive proxy and the proxy backup archive client, and wherein the dummy backup archive proxy creates the resource.

24. The system of claim 23, wherein the computational process comprises a volume shadow copy service, wherein the volume shadow copy service freezes the virtual machine by causing virtual shadow copy service writers to suspend writing data, further comprising:
   requesting, by the backup archive client, a snapshot of the virtual machine in response to the freeze of the virtual machine being successful; and
   terminating, by the backup archive client, the dummy backup archive proxy access to the resource.

* * * * *